May 3. 1932.  C. CURTIS  1,856,320
TRACTOR WHEEL
Original Filed April 5, 1930  2 Sheets-Sheet 1
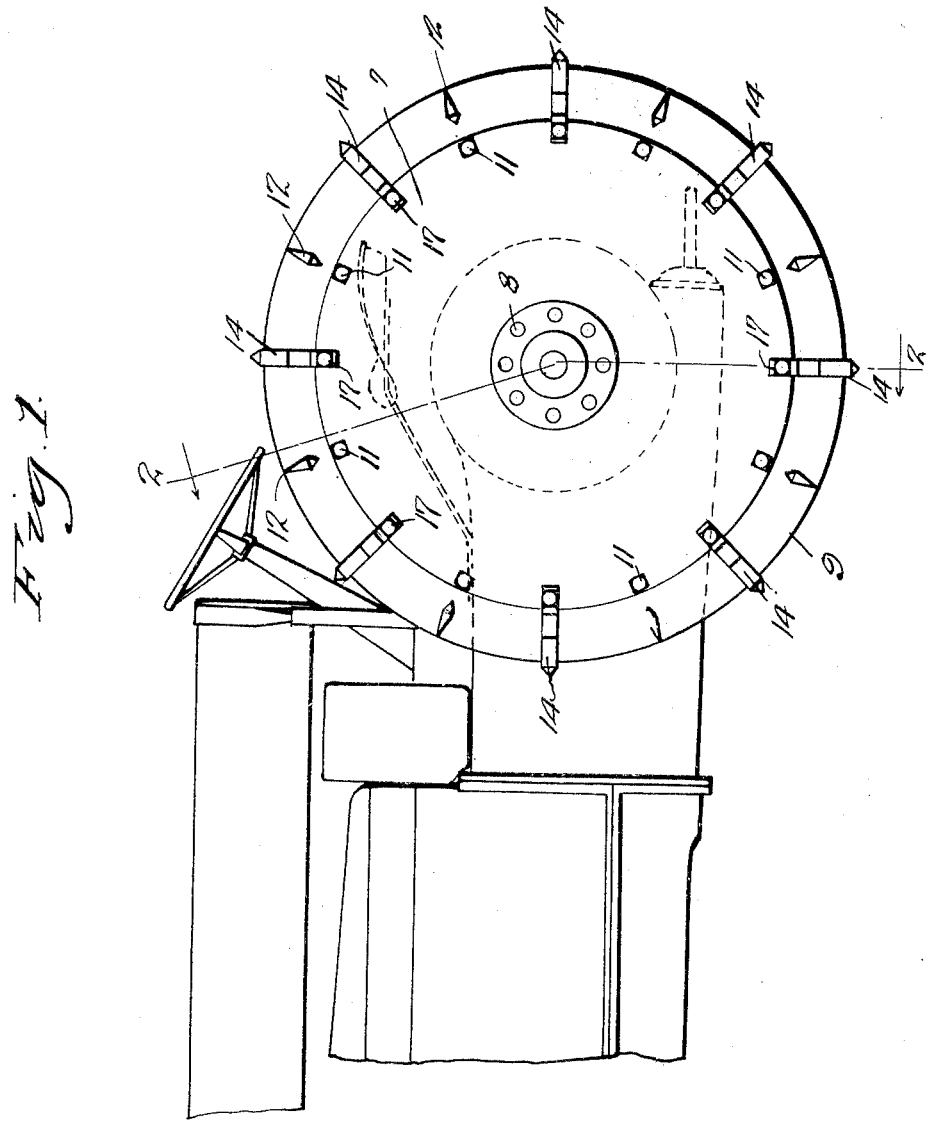
Inventor
Clell Curtis
By Clarence A. O'Brien
Attorney May 3, 1932.   C. CURTIS   1,856,320
TRACTOR WHEEL
Original Filed April 5, 1930   2 Sheets-Sheet 2
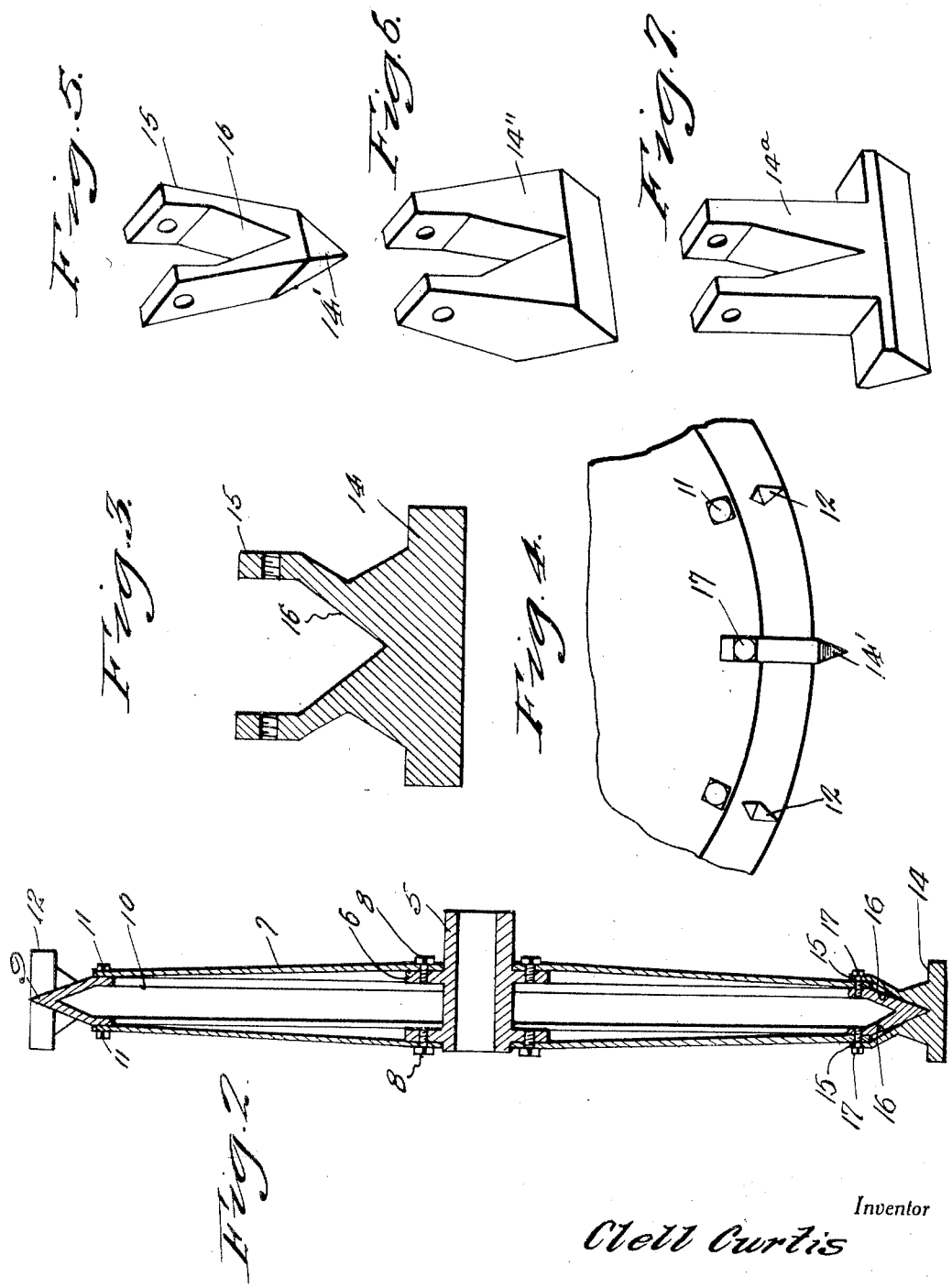
Inventor
Clell Curtis
By Clarence A. O'Brien
Attorney Patented May 3, 1932

1,856,320

UNITED STATES PATENT OFFICE

CLELL CURTIS, OF PLANO, IOWA

TRACTOR WHEEL

Application filed April 5, 1930, Serial No. 442,014. Renewed March 21, 1932.

The present invention relates to a wheel for a tractor and has for its prime object to provide a structure which is simple, strong and durable, easy to assemble, and thoroughly efficient and reliable in use.

Another object of the invention resides in the provision of a tractor wheel having a V-shaped rim with a plurality of calks, thereon, some of which are detachable.

With the above and numerous other objects in view as will appear as the description proceeds, the invention resides in certain novel features of construction, and in the combination and arrangement of parts as will be hereinafter more fully described and claimed.

In the drawings:

Figure 1 is a fragmentary side elevation of a tractor, showing one of my wheels thereon, this figure showing the detachable calks alternately arranged with the integral calks.

Figure 2 is a section on line 2—2 of Figure 1.

Figure 3 is a sectional view through one of the tractor wheel calks.

Figure 4 is an enlarged detail side elevation of a fragment of one of the wheels.

Figures 5, 6, and 7 are perspective views of different embodiments of the detachable calks.

Referring to the drawings in detail, it will be seen that the numeral 5 denotes the hub which has the spaced annular flanges 6 formed thereon. Discs 7 are bolted as at 8, to the flanges, and slightly converge toward each other in the direction of their periphery. A rim 9, V-shaped in cross section, has inner flanges 10, bolted as at 11, inside of the outer edges of the disc 7. A plurality of calks 12 may be welded to the sides of this rim. A plurality of detachable calks are formed with different shaped heads, as is clearly illustrated in Figures 3, 5, 6, and 7, and from these heads project legs 15, to straddle the rim 9, and disks 7. The inner sides of the legs of each calk join inclined walls 16 which define a V-shaped opening adapted to receive the V-shaped rim 9 when the calk is secured to the rim with its legs straddling the disks 7 to which they are secured by bolts 17.

The calk shown in Figs. 1, 2, 3 at 14 is of substantially T-shape with the head 14 extending laterally of the wheel. The calks shown at 14' in Figs. 5 and 4 have their ends pointed while the calk 14" shown in Fig. 6 has its outer end of ridge shape as shown in said figure. Fig. 7 shows a calk 14a of substantially T-shape with its outer part also ridged.

It is thought that the construction, utility and advantages of this invention will now be quite apparent to those skilled in this art without a more detailed description thereof.

The present embodiment of the invention has been described in considerable detail, merely for the purpose of exemplification, since in actual practice it attains the features of advantage enumerated as desirable in the statement of the invention and the above description.

It will be apparent that changes in details of construction and in the combination, and arrangement of parts may be resorted to, without departing from the spirit of the invention or the scope of the appended claim.

Having thus described my invention, what is claimed as new is:

In a tractor wheel of the class described, a hub, a pair of spaced discs secured to the hub, a rim of V-shaped construction in cross section with its tapered end disposed outermost and with its inner edges disposed in overlapping relation against the inner surfaces of the discs and secured thereto, and a plurality of calks removably mounted on the V-shaped portion of the rim each having portions including legs conforming to the V-shape of the rim and to the sides of the discs to straddle the rim, said calks having their legs disposed in overlapping relation with the outer surfaces of the discs and secured thereto, said rim and said calks cooperating to maintain the discs in uniform spaced relation.

In testimony whereof I affix my signature.

CLELL CURTIS.